United States Patent Office 2,811,645
Patented Oct. 29, 1957

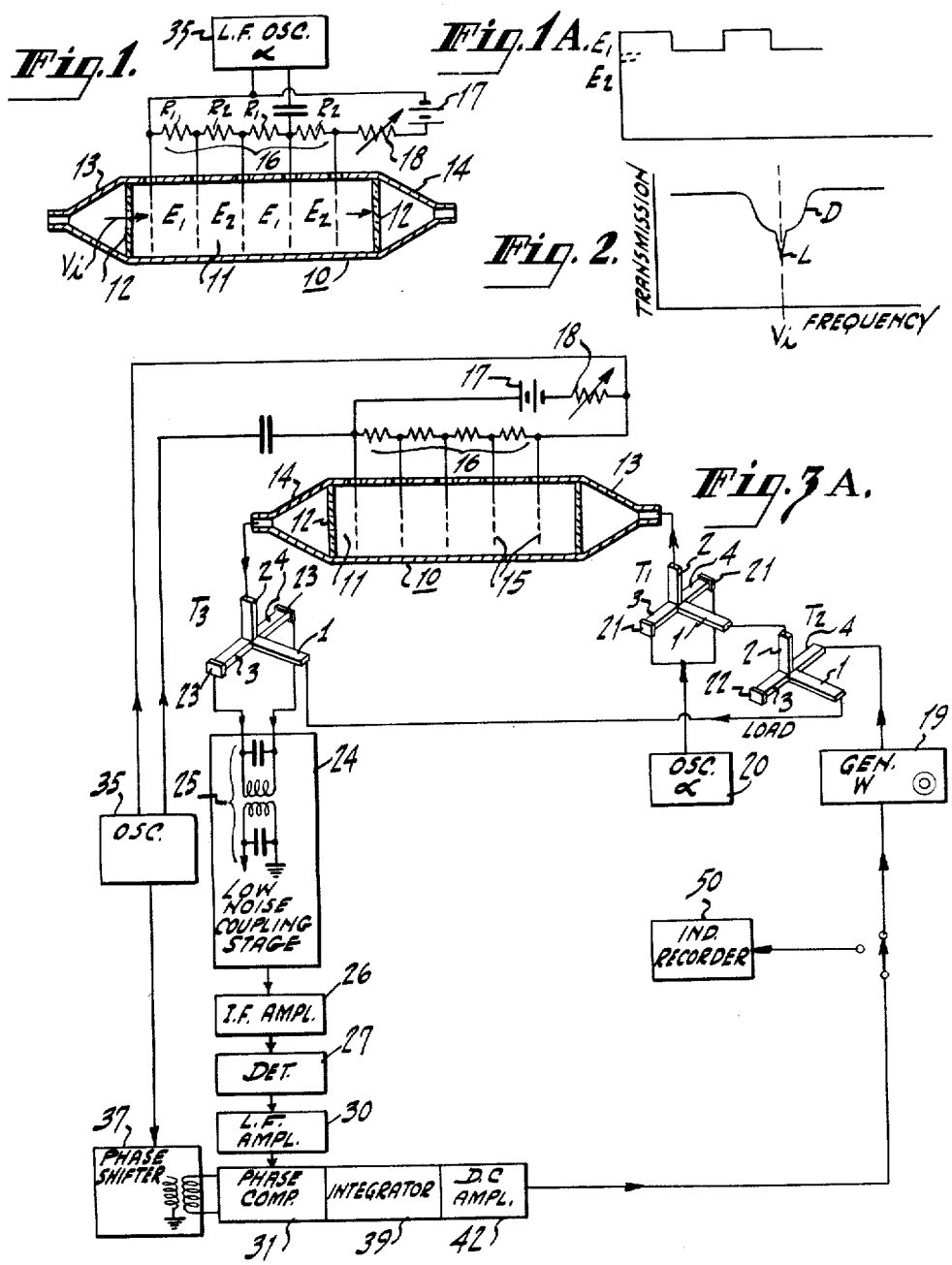

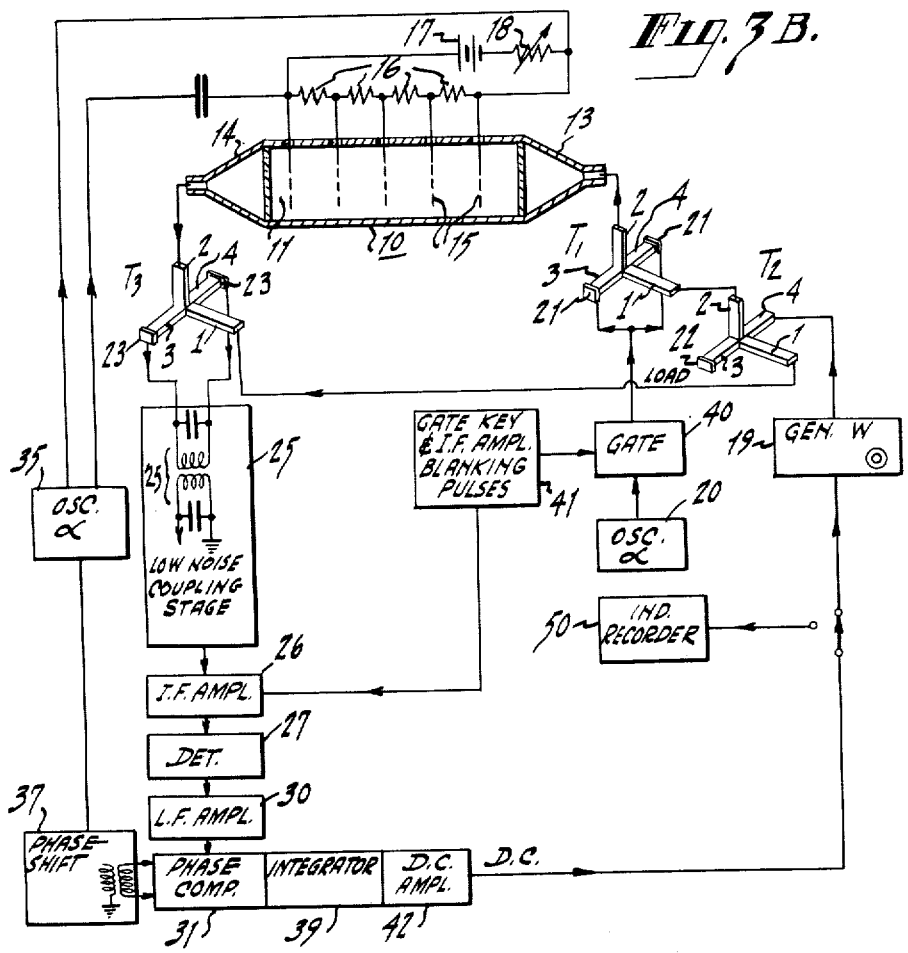

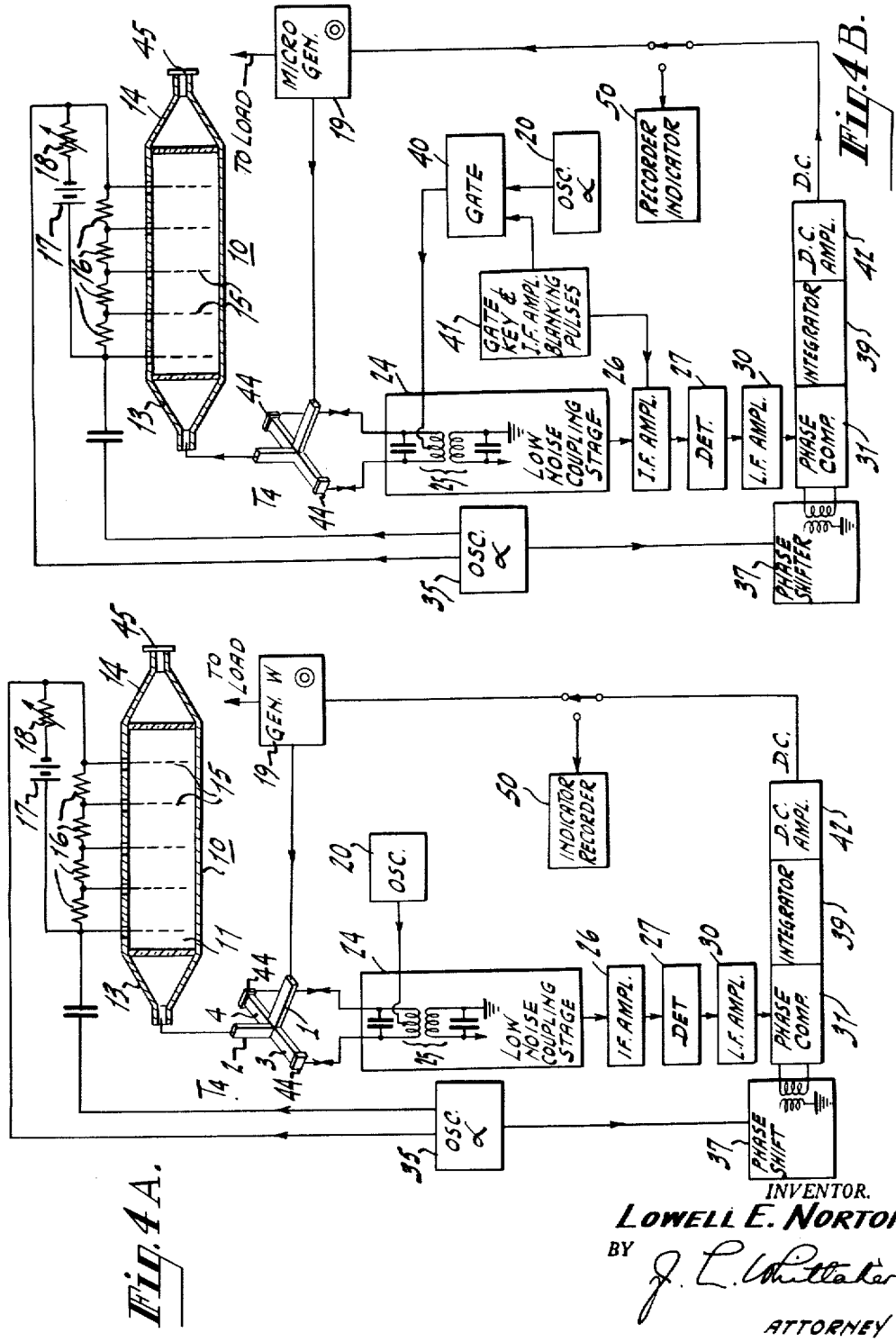

2,811,645

GAS RESONANCE SYSTEM

Lowell E. Norton, Princeton, N. J., assignor to Radio Corporation of America, a corporation of Delaware Application January 26, 1955, Serial No. 484,252

18 Claims. (Cl. 250—36)

This invention relates to microwave methods and apparatus in which a gas is excited to produce spectral lines having Doppler-reduced bandwidth.

The molecular absorption effects exhibited by various gases when subjected to microwave excitation have been employed in frequency control and gas analysis. For rigidity of control in frequency stabilization and for high resolution in microwave spectroscopy, the bandwidth of the detected absorption effects should be narrow with the natural width of the corresponding spectral line of the gas as a limit. Saturation-broadening is avoided by exciting the gas at sufficiently low power levels: collision-broadening is avoided by employing gas at very low pressure: and Doppler-broadening is minimized by use of a gas cell having a spatially periodic field to effect coherent absorption, over a very narrow frequency range, of gas molecules of all velocity classes.

A principal object of the present invention is to provide improved methods and systems which utilize such narrow band, low intensity effect without serious degredation, by noise, of the precise frequency information contained in that effect.

In accordance with the present invention, a generated intermediate frequency signal is used to amplitude-modulate a microwave carrier-frequency and so provide microwave sideband frequencies in addition to the microwave carrier frequencies. One of these microwave frequencies is impressed upon a gas-abroption cell having spatially periodic fields and a low-frequency time-dependent field to produce a micrawave signal having a low-frequency amplitude modulated component with phase information which is critically dependent upon the molecular resonance absorption characteristic of the gas. By successively demodulating this signal, first using one of the microwave frequencies as a beating signal, to produce an intermediate-frequency signal having such phase information in its low-frequency amplitude modulation and then by detecting the low-frequency component of the intermediate-frequency signal, there is produced a low-frequency signal containing the aforesaid phase information. The phase relation of this signal to a phase-reference signal derived from the generator for the time-dependent field, of the cell is a measure of the difference between the microwave excitation frequency for the gas and a molecular resonant frequency of the gas. Preferably and more particularly, the low-frequency phase-information signal and the low-frequency phase-reference signal are utilized to produce a direct-current control voltage of variable polarity and amplitude which may be applied to control the frequency of the microwave carrier or to actuate the indicating or recording instrument of a microwave spectrograph.

In some forms of the invention, the microwave excitation is continuously applied to the gas, whereas in other forms the microwave excitation is pulsed. In the latter, the microwave signal channel is gated so that the microwave frequency phase-information signal is produced by molecular radiation continuing after termination of the individual exciting pulses.

Further in accordance with the invention, the low-frequency phase-information signal is amplified to high level in avoidance of need of high-gain, direct-current amplifiers with their inherent zero drift and instability.

The invention further resides in methods and systems having features hereinafter described and claimed.

For a more detailed understanding of the invention and for illustration of the various embodiments thereof, reference is made to the accompanying drawings, in which:

Figure 1 diagrammatically illustrates a gas cell and associated means for producing spatially periodic field and a time-dependent field therein;

Figure 1A is a graph illustrating voltages applied to electrodes of the cell of Figure 1;

Figure 2 is a plot of the transmission/frequency characteristic of the cell of Figure 1; and Figures 3A, 3B, 4A and 4B are block diagrams schematically illustrating various systems utilizing the cell of Figure 1.

The methods and systems herein described involve use of a gas-absorption cell having spatially periodic fields and a time-dependent field. Referring to Figure 1 as exemplary of a cell of this type, cell 10 comprises a chamber 11 formed by a length of waveguide of circular or other suitable cross-section and which is sealed at opposite ends by windows 12 of mica or other insulating material transparent to microwave energy. The horns or tapered waveguides 13—14 at opposite ends of the chamber provide paths for transmission of microwave energy to or from the gas chamber. The direction of propagation of such energy in the cell is parallel to the axis of chamber 11.

The chamber 11 contains a gas, such as ammonia, exhibiting molecular resonance at microwave frequencies. Gases having such property include ammonia, carbonyl sulfide, the methyl halides, and numerous others. The gas in chamber 11 is at low pressure, for example, of the order of $10^{-5}$ millimeters of mercury.

A series of grids 15 disposed within chamber 11 are spaced in the direction of transmission of the microwave energy with their planes normal to said direction. The grids may each be formed of a plurality of fine wires parallel to each other and normal to the polarization of the propagated microwave energy. The grids may be wound of 1 mil diameter wire on an open frame notched or grooved to maintain accurate spacing of the wires.

The grids 15 are insulated from each other and from the walls of chamber 11. To the grids are applied direct-current potentials of such magnitude that the electrostatic field difference between the successive grids alternates between two values $E_1$, $E_2$ (Figures 1 and 1A). Specifically, the successive grids 15 are connected to points along a potential divider 16 supplied from a direct-current source exemplified by battery 17 and rheostat 18. The alternate resistors $R_1$ of the potential divider are of equal value of resistance. The other resistors $R_2$ are of equal value different from the value of resistors $R_1$.

Assuming that the gas is ammonia and designating an unperturbed spectral line frequency thereof as $\nu_0$, the spectral line frequency for gas in the $E_1$ field zones is $\nu_1 = \nu_0 + BE_1^2$ and the spectral line frequency for gas in the $E_2$ field zones is $\nu_2 = \nu_0 + BE_2^2$. The Stark coefficient B is appropriate for ammonia.

Considering only the spatially periodic fields thus far discussed, the proper microwave frequency for exciting the gas molecule in both the $E_1$ and $E_2$ zones is:

(1) $$\nu_i = \nu_0 + \frac{B}{2}(E_1^2 + E_2^2)$$

the mean of the two perturbed spectral line frequencies $\nu_1$, $\nu_2$.

The gas within chamber 11 is also subjected to a time-dependent field produced, in the particular arrangement shown, by a low-frequency oscillator 35 connected across the potential-divider 16 through a blocking condenser 51. The operating frequency δ of oscillator 35 is preferably in the range of 30–2000 cycles.

Assuming $E_1$, $E_2$ of Equation 1 represent only the constant component of the fields and that the time-dependent or A. C. components vary sinusoidally about these D. C. values, then the frequency $\nu_i$ of Equation 1 is also the proper microwave frequency for exciting for the gas as additionally subjected to the A. C. components.

Thus far the effect of movement of the molecules has not been discussed. Because the absorbing gas molecules are at some temperature T, they have thermal energy ($kT$) and move with random velocity through the grids 15 from one Stark field zone to another. Because of the low pressure of the gas, all molecules traversing the grids suffer a negligibly small number of collisions with other molecules. Furthermore, the transparency of the grids and the cell dimensions are sufficiently large to insure that any molecular collisions with the grids and chamber wall contribute only negligibly to the total spectral line bandwidth.

For clarity of explanation, it is first assumed that the A. C. component of the grid potential is removed but the D. C. potentials are still applied. Any molecule of any velocity class in traversing the grids 15 sees the perturbed spectral line frequencies $\nu_1$, $\nu_2$ in repeating sequence or spatial periodicity. Under this circumstance, the absorption of any molecule of any velocity class has, as referred to any arbitrary reference phase, a phase ($\phi_1$) while it is in an $E_1$ field zone and another phase ($\phi_2 = -\phi_1$) while it is in an $E_2$ field zone. Therefore in traversing the series of grids 15, the absorption of a moving molecule of any velocity class undergoes a periodic phase-modulation which contains spectral line information which may be utilized as is later described. The time derivative of this periodic phase-modulation, i. e., the corresponding frequency-modulation, also contains such spectral line information and may be similarly utilized.

As now explained, the repetition frequency characteristic of this periodic phase-modulation depends upon the spacing between the grids and the particular velocity of the molecule passing through the grids. The spacing (S) between adjacent grids may be so selected that (2) $$2S = a\lambda_c$$

where $\lambda_c$ is excitation wavelength in cell at frequency $\nu_1$, and $a$ is an integer.

For a molecule moving with velocity $v$, the time (T) necessary to traverse two successive zones $E_1$, $E_2$ is (3) $$T = \frac{2S}{v} = \frac{a\lambda_c}{v}$$

and hence the fundamental repetition frequency ($f$) of the molecular modulation is (4) $$f = \frac{1}{T} = \frac{v}{a\lambda_c} = \frac{v\nu_1}{ac'}$$

where $c'$ is the velocity of propagation in the cell of the excitation field of frequency $\nu_1$.

With a sufficiently large number of grids 15, the spatial periodic Stark field traversed by a molecule could be made sinusoidal and the only phase-modulation repetition-frequency would be the fundamental frequency $f$ of Equation 4. Instead, and preferably, only a relatively few grids, for example, 19 with only 2 per period are used, and the resultant phase-modulation instead of being a single frequency is a plurality of discrete frequencies:

(5) $$f' = \frac{nv}{ac'}\nu_1$$

where $n$ is an integer displaced from the excitation frequency $\nu_1$ by $\pm f'$.

Consequently, a molecule moving with velocity $v$ through the grids structure of the cell and subjected to an exciting microwave frequency $\nu_1$ sees a Doppler-shifted frequency (6) $$\nu_D = \nu_i\left(1 \pm \frac{v}{c'}\right)$$

where the minus or plus sign depends upon whether the molecular motion is the same as, or counter to, the direction of propagation of the excitation field of frequency $\nu_1$. Because of the motion of the molecule, the Doppler-shifted excitation frequency is (7) $$\nu_D = \left[\nu_0 + \frac{B}{2}(E_1^2 + E_2^2)\right]\left[1 \pm \frac{v}{c'}\right]$$

As discussed in connection with Equation 5, movement of the molecule through the spatial periodic Stark field results in discrete side frequencies displaced from the excitation frequency. Therefore molecular absorption for the Doppler-shifted excitation frequency occurs at discrete frequencies (8) $$\nu_a = \left[\nu_0 + \frac{B}{2}(E_1^2 + E_2^2)\right]\left[1 \pm \frac{v}{c'} + \frac{nv}{ac'}\right]$$

As may be seen from Equation 8, if the grid spacing is made one-half wave-length (i. e., $a=1$), then the fields associated with the first order lower sideband frequency ($n=-1$) of the absorption add coherently and in phase for all molecules moving contra to the direction of propagation of the electromagnetic excitation field. Thus, for molecules of all velocity classes moving in such direction, there is discrete frequency absorption at (9) $$\nu_a' = \nu_0 + \frac{B}{2}(E_1^2 + E_2^2) = \nu_i$$

Furthermore, the fields associated with the first order upper sideband frequency ($n=+1$) of the absorption also add coherently and in phase for all molecules moving in the same direction as the direction of propagation of the exciting microwave field. Significantly, this discrete frequency-absorption also occurs at

(10) $$\nu_a'' = \nu_0 + \frac{B}{2}(E_1^2 + E_2^2) = \nu_i$$

As shown by Equations 9 and 10, for halfwave spacing of the grids, the absorption of molecules of all velocity classes, regardless of Doppler effect, is coherent at the incident excitation frequency $\nu_1$. All other discrete frequency-absorptions occur at frequencies which are functions of particular molecular velocities and so add incoherently in the frequency spectrum.

As shown in Figure 2, the frequency/transmission characteristic of gas confined in the cell of Figure 1 with halfwave grid spacing has a very sharp absorption spike L, contributed to by all molecules, superposed on a normal Doppler-broadened base line D. As exemplary of the sharpness of the absorption spike, its observed width was about 5 kilocycles at an excitation frequency of 25·715 kilomegacycles, the 7, 7 line of ammonia. In general, the Q of the spike L is of the order of $5 \times 10^6$ or greater. In this very narrow absorption spike is contained the spectral line information of interest in microwave spectral analysis and in frequency control of microwave generators.

As now explained, such great sharpness is obtainable for other particular spacings of the grids 15. If the term "$a$" of Equation 8 is chosen to be 2 (i. e., spacing $S=\lambda_c$), then the second order lower sideband frequencies of the absorption add coherently at excitation frequency $\nu_1$ for molecules of all velocity classes moving in direction contra to the propagation of the microwave excitation field and the second order upper side frequencies of the absorption also add coherently at excitation frequency $\nu_1$ for molecules of all velocity classes moving in the same direction as the propagated excitation field.

The general rule is that the order of the discrete upper and lower side frequencies which add coherently at frequency $\nu_1$, independently of molecular velocity, to form the sharp spike L of Figure 2, is equal to the selected value of integer $a$. In other words, the spacing S between grids 15 may be any small number of half-wavelengths of the microwave excitation as propagated in the absorption cell 10, for example, $$S=\frac{\lambda_c}{2},\ S=\lambda_c,\ S=\frac{3\lambda_c}{2}$$

or generally, $$S=\frac{a\lambda_c}{2}$$

The presence of the A. C. component added to the spatially periodic field modifies the foregoing in significant manner now briefly discussed.

The ratio of the A. C. component ($E_1^1$) of the Stark field to the D. C. component ($E_1$) is $$\frac{E_1^1}{E_1}=M_s$$

and the ratio of the A. C. component $E_2^1$ to the D. C. component $E_2$ is $$\frac{E_2^1}{E_2}=M_s$$

In both cases, the ratio $M_s$ has the dimensions of a modulation factor. Application of the A. C. components, provided by oscillator 35 at frequency $\delta$, periodically varies the molecular resonance frequency of the gas while the excitation frequency $\nu_1$ remains constant. The effect is to amplitude-modulate a term of the microwave output signal of the cell as hereinafter more fully discussed.

The systems shown in Figures 3A, 3B, 4A, 4B utilize the cell of Figure 1 and the relatively narrow bandwidth effect of the sharp absorption spike L with substantially less degration, by noise, of the precise spectral line frequency information.

Referring to Figure 3A, microwave output at frequency $\omega$ from microwave generator 19 is applied to arm 4 of a magic tee T2. The generator 19 may be a klystron, magnetron or other suitable microwave oscillator: equivalently, it may be a lower frequency oscillator followed by frequency multipliers to provide microwave output at frequency $\omega$. The output at frequency $\omega$ from arm 2 of magic tee T2 is supplied to arm 1 of a second magic tee T1. A lower or intermediate frequency $\alpha$, for example 30 megacycles, is supplied from oscillator 20 in addition to the microwave carrier frequency $\omega$, to diodes 21, 21 in arms 3 and 4 of magic tee T1 which is used as a balanced modulator to produce microwave sideband frequencies $(\omega+\alpha)$, $(\omega-\alpha)$. The electrical length of these arms differs by an odd number of quarter-wavelengths at the carrier frequency $\omega$ to permit parallel modulating excitation of diodes 21, 21. The output of modulator T1 is supplied to input horn 13 of gas cell 10 by output arm 2 of the modulator.

The frequencies $\omega$ and $\alpha$ are so chosen that one of the microwave frequencies is equal to the required excitation frequency $\nu_1$. For example, and as a preferred operating adjustment, the carrier output $\omega$ is largely suppressed in the balanced modulator and the upper sideband frequency $$\left(\frac{\omega+\alpha}{2\pi}\right)$$

is chosen to be equal to the required excitation frequency. The lower sideband frequency $$\left(\frac{\omega-\alpha}{2\pi}\right)$$

is not at a frequency which excites molecular absorption and any residual of the suppressed carrier frequency ($\omega$) is also incorrect for molecular absorption excitation.

Having in mind that the carrier applied to modulator T1 is

(11)  $e = E \cos \omega t$ and that the modulating signal applied thereto is

(12)  $e_1 = E_1 \cos \alpha t$ the only term of interest in the balanced modulator output for producing an exciting field in the gas cell is

(13)  $e_3 = \frac{mE}{2} \cos (\omega+\alpha)t = \frac{mE}{2} \cos 2\pi\nu_i t$ where $m$ is a modulator factor.

Thus, a molecule of any velocity class $v$, travelling away from this field will see

(14)  $e_4 = \frac{mE}{2} \cos\left[2\pi\nu_i\left(1-\frac{v}{c'}\right)t\right]$ The phase-modulation of the molecular absorption, which is due to the movement of the molecules at thermal velocity through the spatial periodic Stark field (i. e., D. C. component only) can be considered as negative field sources:

(15)  $e_5 = \frac{\alpha_g mE}{2} \cos\left[2\pi\nu_i\left(1-\frac{v}{c'}\right)t + \Phi \sin \frac{nv}{ac'}\nu_i t\right]$ where $\alpha_g$ has the dimensions of an absorption factor and $\Phi$ is the magnitude of the phase-modulation component for repetition frequency $$\frac{nv}{ac'}\nu_i \text{ (Equation 5)}$$

Assuming, for purposes of illustration, that the grid spacing is so chosen that $2=1$, then the only phase-modulation component of interest is the fundamental, and Equation 15 reduces to

(16)  $e_5 = \frac{\alpha_g mE}{2} \cos\left[2\pi\nu_i\left(1-\frac{v}{c'}\right)t + \Phi_1 \sin \frac{v}{c'}\nu_i t\right]$ $\Phi_1$ is the magnitude of the fundamental of the phase-modulation component.

By expanding Equation 16 and retaining only the first order side frequencies (the others being of no interest for $a=1$), Equation 15 further reduces:

(17)  $e_5^1 = \frac{-\alpha_g mE}{2} J_{1(\Phi_1)} \cos \nu_i t$ where $J_{1(\Phi_1)}$ is the appropriate Bessel coefficient.

In similar manner for all molecules moving into the field $E_3$ (Equation 13), the Doppler-shifted frequency is $$\nu_i\left(1+\frac{v}{c'}\right)$$

and these molecules will see fields similar to those defined by Equations 14 and 15 except they will contain $$\left(1+\frac{v}{c'}\right)$$

instead of $$\left(1-\frac{v}{c'}\right)$$

By expanding these and retaining only the first order sideband frequencies, an equation identical with Equation 17 will result.

In other words, the two first order phase-modulation components of the absorption add coherently and in phase. The transmission characteristics of the molecules of all velocity classes in the spatial periodic Stark field of gas cell 10 therefore has, as shown in Figure 2, a very narrow bandwidth at frequency $\nu_1$.

Because of the previously described transmission characteristics of gas cell 10, still considering only the D. C. component of Stark fields, its output signal includes the term

(18)  $e_5'' = -\alpha_g mE J_{1(\Phi_1)} \cos (\nu_i t + \phi_g)$ where $\phi_g$ is a critically frequency dependent phase due to the anomalous behavior of the refractive index of the gas near molecular resonance.

However, the presence of the A. C. component modifies Equation 18 because of the modulation $\delta$ superposed on the D. C. voltages. Under this circumstance, the Stark perturbed frequency for a linear Stark effect is obvious: for the larger quadratic Stark effect it is

(19)
$$\nu = \nu_0 + BE^2(1+M_s \sin \delta t)^2 = \nu_0 + BE^2(1+ \\ 2M_s \sin \delta t + M_s^2 \sin^2 \delta t) = \nu_0^2 + BE^2(1+ \\ \frac{2M_s \sin \delta t + M_s^2 - M_s^2 \cos 2\delta t}{2}$$

The modulation factor $M_s$ is so chosen that $M_s \ll 1$ in which case Equation 19 reduces, very closely, to

(20) $\quad \nu = \nu_0 + \frac{BE^2}{2}(1+2M_s \sin \delta t$

The result of the A. C. perturbation of the spatial periodic field is to modify the signal output term of the cell (Equation 18) so that it becomes

(21)
$$e_s''' = -\alpha_g m E J_{1(\Phi 1)} \cos(\nu_i t + \phi_g)[1+M_s^1 \sin b\delta t]$$

where $M_s^1$ is the effective Stark amplitude-modulation and $b$ assumes integral values.

Because a coherent detection system is used, all integral values of $\delta$ other than unity are rejected, and Equation 22 reduces to

(22)
$$e_s''' = -\alpha_g m E J_{1(\Phi 1)}(1+M_s' \sin \delta t) \cos(\nu_i + \phi_g)$$

The output of cell 10 including each output term (Equation 22) is supplied through output horn 14 to arm 2 of a third magic tee T3 to whose arm 1 is supplied microwave energy of frequency $\omega$ from arm 1 of magic tee T2. The magic tee T2 isolates the magic tees T1 and T3 from each other and also provides a transmission path, through its arms 3 and 4, from the microwave generator 19 to a load 22, such as an antenna system of a frequency-stabilized microwave transmitter.

In arms 3, 4 of magic tee T3, the fields at detectors 23, 23 have, because of known properties of the magic tee, a phase difference of $\pi$. These fields, in combination with the fields produced by input $\omega$ of the balanced demodulator T3, produce an output signal including the term

(23) $e_o = -\alpha_g m m_1 E J_{1(\Phi 1)}(1+M_s^1 \sin \delta t) \cos(\alpha t + \Phi_g)$ where $m_1$ is a modulation factor due to detectors 23, 23.

This signal, containing the spectral line phase information, is applied to a low noise coupling stage 24, such as a cascode amplifier stage, having a push-pull single-ended input transformer 25 required because of the previously mentioned phase difference in arms 3, 4 of magic tee T3. The output of stage 24 is applied to the intermediate frequency amplifier stage 25 and thence to detector 27.

The demodulated output of the second detector 27 is

(24) $e_7 = -\alpha_g m m_1 M_s^1 m_2 E J_{1(\Phi 1)} \sin(\delta t + \Phi_g)$

This low-frequency output signal containing phase information critically related to the molecular resonance of the gas in cell 10 is applied to low-frequency amplifier 30 which is preferably a high-gain amplifier and thence to an input circuit of phase-comparator 31.

To the other input circuit of phase-comparator 31 is applied a phase-reference signal derived from oscillator 35 whose output is

(25) $\quad e_s = E_8 \sin \delta t$

Before its application to the phase-comparator 31, the output of oscillator 35 is shifted $\pi/2$ in phase.

The output of phase-comparator 31 is

(26) $\quad e_9 = -\alpha_g m m_1 M_s^1 m_2 m_3 E \sin \phi_g$ wherein $m_3$ is the modulation factor of the comparator.

When the microwave frequency $\nu_i$ applied to cell 10 is equal to the sum $(\omega + \alpha)$ of the frequencies of oscillators 19 and 20 and is equal to the required excitation frequency $$\nu_0 + \frac{B}{2}(E_1^2 + E_2^2)$$

of the gas, then $\phi_g = 0$ and $e_9 = 0$. When, however, the applied frequency departs from the required excitation frequency in either direction, $\phi_g$ is positive or negative, depending upon the sense of the departure. Because $\sin \phi_g = -\sin(-\phi_g)$, the signal voltage $e_9$ changes polarity for frequency deviations of opposite sense of departure.

This direct-current signal containing the significant phase-information is integrated, amplified by a low-gain direct-current amplifier 42 when necessary, and utilized as a control voltage for controlling the frequency of the microwave oscillation generator 19. If generator 19 is a microwave oscillator, such as a klystron, the control voltage may be applied to a frequency-control electrode thereof. If it is a lower frequency oscillator followed by frequency multipliers, the control voltage may be applied to a reactance tube frequency-control for the oscillator. Both of these methods of frequency control are per se well known and need not be further described.

Since a high-gain low-frequency amplifier 30 may be used between mixer 27 and comparator 31, it is not necessary to use a high-gain direct-current amplifier for the output of comparator 31. Hence, the problems of zero drift and instability common to high-gain direct-current amplifiers are avoided.

The time constant of integrator 39 is made appropriate for the selected low frequency $\delta$. In practice, the equivalent circuit bandwidth has been made very narrow, the exact value depending upon the inherent stability of the carrier source 19 to be stabilized. For a crystal-controlled oscillator followed by the necessary frequency multipliers, the effective bandwidth may be of the order of 0.05 cycle.

The system shown in Figure 3B also provides for utilization of the small intensity narrow bandwidth effect of the absorption spike L (Figure 2) without serious degradation, by noise, of the precise narrow-band information. This system is similar to that of Figure 3A except for addition of an electronic gate 40 and a pulse-generating unit 41. The latter produces electrical pulses, which as applied to gate 40, periodically open and close the transmission path from the modulating oscillator 20 to the balanced modulator T1 and, which as applied to the intermediate frequency amplifier 26 periodically desensitizes and sensitizes it. The duration of these keying and blanking pulses may be of the order of one microsecond and the interval between pulses may be somewhat longer.

Designating the pulse repetition rate as $p$, the effect of gating is to produce additional sideband frequencies spaced $\pm p$, $\pm 2p$, $\pm 3p$ . . . $\pm np$ from the sideband frequencies $(\omega + \alpha)$ and $(\omega - \alpha)$. For this reason, the pulse repetition frequency is chosen to be at least somewhat greater than the bandwidth of the absorption spike L of Figure 2.

The blanking pulses as applied to the intermediate frequency amplifier 26 make it inoperative during, and for a short time following, the application of excitation pulses of gas cell 10 so that in effect the signal received by the detector 27 is due to coherent emission continuing from the absorbing molecules after termination of their excitation. Further description of Figure 3B is unnecessary as the preceding description of Figure 3A is applicable thereto.

The system shown in Figure 4A, except in respects specifically discussed below, is similar to that of Figure 3A whose description is generally applicable here. In the system of Figure 4A, the single magic tee T4 replaces the two magic tees T1, T3 of Figures 3A, 3B and serves both as a balanced modulator and as a balanced demodulator. In the system of Figure 4A, the horn 14 of the gas-absorption cell 10 terminates in a reflector 45 so that the microwave excitation traverses the cell twice. The reflector 45 is so located for phasing of the incident and reflected excitation that the double traverse of the cell effects doubling of the signal field and quadrupling of the output signal power of the cell.

The microwave carrier $\omega$ from the microwave generating means 19 is applied directly to arm 1 of the magic tee T4. The lower-frequency output $a$ of modulating oscillator 20 is applied to detectors 44, 44 in arms 3, 4 of the magic tee: so far as this output is concerned, the detectors operate in phase by virtue of the center-tap connection by winding 46 of input transformer 25 for the low-noise coupling stage 24.

Preferably, and as before described in connection with Figure 3A, the carrier and modulating frequency may be so chosen that $$\omega + \alpha = \nu_i = \nu_0 + \frac{B}{2}(E_1^2 + E_2^2)$$

the carrier being largely suppressed. Because of the $\pi/2$ differential path length of arms 3, 4, the sideband outputs from the detectors 44, 44 to cell 10 are in phase. Because of the center-tap connection, the microwave excitation does not appear across the secondary winding 47 of input transformer 25 of stage 24.

The microwave excitation from arm 2 of the magic tee T4 traverses the cell 10 to and back from the reflector 45 and reenters arm 2 of magic tee T4 which serves as a balanced demodulator for the cell signal. The transmission properties of the magic tee T4, the $\pi/2$ differential in the length of its arms 3, 4 and the push-pull single-ended transformer 25, provide such overall phasing that the signal channel to detectors 44, 44 is effectively decoupled from the oscillator 20. Hence, for perfect adjustment, output from oscillator 20 does not enter the signal channel and I. F. amplifier, nor is signal channel power wasted by entering the output circuit of oscillator 20. The remainder of the system of Figure 4A is similar to that of Figure 3A and need not be further described.

In the system of Figure 4A, the microwave excitation and the microwave signal are simultaneously present in the combined modulator-demodulator T4. Since both are at the same frequency, this imposes severe requirements upon the design and balance of this unit.

Such requirement may be relaxed by modifying the system of Figure 4A to include provision for pulse excitation of the gas instead of continuous excitation. More specifically and as shown in Figure 4B, a gate 40 interposed in the path from oscillator 20 to the diodes 44 of the modulator-demodulator T4 is periodically operated by switching pulses from the keyer 41. Under pulsed excitation conditions, the magic tee T4 functions alternately, instead of simultaneously, as a balanced modulator supplying microwave excitation for cell 10 and as a balanced demodulator for the output signal of cell 10.

As in the system of Figure 3B, the lowest suitable value of the pulse-repetition frequency is set by the width of the absorption spike L of Figure 2. The excitation pulses may, for example, be of one microsecond duration and the interval between pulses may be somewhat longer. Also, as in the system of Figure 3B, pulse output from keyer 41 is used to blank the amplifier 26 during each of the excitation pulses and for a short while thereafter so that the gas cell signal received by mixer 27 is in effect due to coherent emission continuing from the absorbing molecules after termination of the individual excitation pulses.

The system of Figure 4B is otherwise similar to that of Figure 3B and need not be further described.

In all of the systems as above described, the direct-current output of the phase-comparator 31 is utilized as a frequency-control voltage for the microwave generating unit 19. These systems may also be utilized in microwave spectroscopy for sharply resolving individual spectral lines of a gas or a mixture of gases. For such latter purpose, the frequency of generating unit 19 is swept over the absorption range to be investigated and the output of phase-comparator 31 is applied to a recorder or indicator 50 to show or plot the absorption of the gas over the scanned frequency range.

What is claimed is:

1. A system for utilizing molecular resonance of a body of gas confined at a low pressure which comprises, means for generating a microwave carrier frequency, means for modulating said carrier frequency by a modulation signal to produce microwave sideband frequencies in addition to said microwave carrier frequency, means for applying one of said microwave frequencies to said body of gas to excite said gas, subjecting the excited gas to a spatially periodic field so as to produce a microwave signal having phase information critically dependent upon molecular resonance of the gas, means for subjecting the excited gas to a low frequency time-dependent field to amplitude-modulate said microwave signal, means for beating said amplitude-modulated microwave signal with one of said microwave frequencies to produce a low frequency signal containing said phase information, means for producing a low frequency phase-reference signal, and means for comparing the phase relation of said low frequency phase-reference signal and said low frequency signal containing critical phase information as a measure of the difference between a molecular resonance frequency of the gas and the microwave excitation frequency thereof.

2. A system for utilizing molecular resonance of a gas confined at low pressure which comprises, means for generating a microwave carrier frequency, means for generating an intermediate frequency, applying said frequencies to a modulator to produce microwave sideband frequencies in addition to the microwave carrier frequency, means for applying one of said microwave frequencies to excite the gas, means for subjecting the excited gas to a spatially periodic field so to produce a microwave signal having phase-information critically dependent upon molecular-resonance absorption of the gas, means for subjecting the excited gas to a low-frequency time-dependent field to amplitude-modulate said microwave signal, means for applying said microwave signal and one of said generated microwave frequencies to a demodulator to produce an intermediate frequency signal, means for detecting the low-frequency modulation component of said intermediate frequency, which low-frequency component contains said phase-information, means for generating a low-frequency phase-reference signal, and means for applying said phase-reference signal and said low-frequency modulation component to a phase-comparator to produce a direct-current control voltage of polarity and amplitude dependent upon the existing difference between a molecular resonance frequency of the gas and the microwave excitation frequency.

3. A system as in claim 2 in which one of the sideband frequencies is selectively applied to excite the gas.

4. A system as in claim 2 in which the gas is continuously excited by the selected microwave frequency.

5. A system as in claim 2 in which the gas is periodically excited by the selected microwave frequency and in which the low-frequency modulation component is detected only during the non-excitation periods.

6. A system as in claim 2 in which means is provided for applying the direct-current control voltage to stabilize the microwave carrier frequency.

7. A system as in claim 2 in which the excitation frequency is varied over a range and in which the direct-current control voltage is applied to an indicating or recording instrument.

8. A system as in claim 2 in which the intermediate-frequency signal is amplified to high level in avoidance of need for high amplification of the direct-current control signal.

9. A system comprising a gas cell containing a molecularly resonant gas at low pressure, means for generating a microwave carrier frequency, means for modulating said microwave carrier frequency to produce microwave sideband frequencies in addition to the microwave carrier frequency, means for applying one of said microwave frequencies to said gas or to excite the gas contained therein, means for subjecting the excited gas in said cell to a spatially periodic field for producing a microwave signal having phase information critically dependent upon the molecular resonance of said gas, means for subjecting said excited gas to a low frequency time-dependent field to amplitude-modulate said microwave signal, means for beating said microwave signal containing phase information with one of said microwave signals to produce a low frequency signal containing said phase information, means for producing a low frequency phase-reference signal, and means for comparing the phase relation of said low frequency phase-reference signal and said low frequency signal resulting from said beating as a measure of the difference between a molecular resonance frequency of said gas and the microwave excitation frequency thereof.

10. A system comprising means for generating a microwave carrier-frequency, and intermediate frequency and a low-frequency, modulator means having input circuits upon which said microwave carrier and intermediate frequencies are impressed to produce microwave sideband frequencies in addition to said microwave carrier-frequency, and absorption cell containing gas at low pressure and to which one of said microwave frequencies is applied to excite the gas, said cell having means associated therewith for producing therein spatially periodic fields modulated by said low-frequency, demodulator means upon which one of said microwave frequencies and the microwave output of said cell are impressed to produce an intermediate frequency signal with a low-frequency modulation component containing phase-information critically dependent upon the gas absorption at and near molecular resonance, a detector for said low-frequency modulation component, and a phase-comparator upon which the output of said detector and the generated low-frequency are applied to produce a direct-current control voltage of polarity and amplitude dependent upon the difference between the existing microwave frequency and a molecular resonance frequency of the gas.

11. A system as in claim 10 in which a single magic tee serves both as said modulator and said demodulator and in which the gas cell is connected at one end to an arm of said magic tee, the other end of said cell being provided with a reflector.

12. A system as in claim 11 in which the gas is continuously excited, said magic tee simultaneously serving both as a modulator and as a demodulator.

13. A system as in claim 11 additionally including a periodically keyed gate in the intermediate frequency circuit of the magic tee whereby the magic tee alternately serves as the modulator and the demodulator.

14. A system as in claim 10 in which magic tees connected to opposite ends of the absorption cell respectively serve as the modulator means and the demodulator means and in which a third magic tee supplies one of the microwave frequencies to both of the other tees while effectively decoupling them for other frequencies.

15. A system as in claim 10 in which the direct-current control voltage is applied to frequency-stabilize the means for generating the microwave carrier.

16. A system as in claim 10 in which means is provided to vary the microwave carrier-frequency, and in which an indicating or recording instrument is connected for response to the direct-current control voltage.

17. A system as in claim 10 in which an electronic gate is in circuit between the modulator means and the means for generating the intermediate frequency, in which an intermediate frequency amplifier is in circuit between the demodulator means and the detector, and in which a pulse generator supplies keying pulses to said gate and blanking pulses to said amplifier.

18. A system as in claim 10 in which a low-noise cascode coupling stage is in circuit between the demodulator means and the detector.

No references cited.

UNITED STATES PATENT OFFICE
Certificate of Correction

Patent No. 2,811,645            October 29, 1957

Lowell E. Norton

It is hereby certified that error appears in the printed specification of the above numbered patent requiring correction and that the said Letters Patent should read as corrected below.

Column 1, line 34, after "serious" for "degredation" read —degradation—; line 42, for "gas-abroption" read —gas-absorption—; line 44, for "micrawave" read —microwave—; column 5, line 35, for "degration" read —degradation—; column 6, line 35, before "$\Phi_1$" insert —where—; column 7, line 30, center portion of equation (22), for "$(1+M_s' \sin \delta t)$" read —$(1+M_s^1 \sin \delta t)$—; line 47, equation (23), for "$(at+\Phi_g)$" read —$(at+\phi_g)$—; line 58, equation (24), for "$\sin (\delta t+\Phi_g)$" read —$\sin (\delta t+\phi_g)$—.

Signed and sealed this 21st day of January 1958.

[SEAL]

Attest:
KARL H. AXLINE,
*Attesting Officer.*

ROBERT C. WATSON,
*Commissioner of Patents.*